United States Patent
Jeong et al.

(10) Patent No.: US 12,279,322 B2
(45) Date of Patent: Apr. 15, 2025

(54) METHOD AND APPARATUS FOR PROVIDING SERVICE IN WIRELESS COMMUNICATION SYSTEM

(71) Applicant: Samsung Electronics Co., Ltd., Suwon-si (KR)

(72) Inventors: Sangsoo Jeong, Suwon-si (KR); Dongeun Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 17/766,672

(22) PCT Filed: Nov. 9, 2020

(86) PCT No.: PCT/KR2020/015639
§ 371 (c)(1),
(2) Date: Apr. 5, 2022

(87) PCT Pub. No.: WO2021/091351
PCT Pub. Date: May 14, 2021

(65) Prior Publication Data
US 2024/0080922 A1 Mar. 7, 2024

(30) Foreign Application Priority Data

Nov. 7, 2019 (KR) .................. 10-2019-0142013
Feb. 17, 2020 (KR) .................. 10-2020-0019238

(51) Int. Cl.
*H04W 48/18* (2009.01)
*H04W 60/04* (2009.01)
(Continued)

(52) U.S. Cl.
CPC .......... *H04W 76/15* (2018.02); *H04W 48/18* (2013.01); *H04W 60/04* (2013.01); *H04W 88/10* (2013.01)

(58) Field of Classification Search
CPC ....... H04W 4/14; H04W 24/04; H04W 48/18; H04W 60/04; H04W 76/15; H04W 76/30; H04W 76/34; H04W 88/10; H04W 88/18
See application file for complete search history.

(56) References Cited

U.S. PATENT DOCUMENTS 10,142,827 B2   11/2018   Jeong et al.
10,313,997 B2 *  6/2019   Singh .................... H04W 60/04
(Continued)

FOREIGN PATENT DOCUMENTS

CN   103733658 A   4/2014
CN   109788446 A   5/2019
(Continued)

OTHER PUBLICATIONS

3rd Generation Partnership Project; Technical Specification Group Services and System Aspects; System Architecture for the 5G System (5GS); Stage 2 (Release 16), 3GPP TS 23.501 V16.2.0, Sep. 24, 2019, Sophia Antipolis, France.
(Continued)

*Primary Examiner* — Alpus Hsu
(74) *Attorney, Agent, or Firm* — Jefferson IP Law, LLP

(57) ABSTRACT

A method performed by an access and mobility management function (AMF) in a wireless communication system according to an embodiment of the present disclosure may include receiving a network registration request message from a terminal, determining whether or not the terminal requires support for multiple-radio network access, in case that the terminal requires support for the multiple-radio network access, requesting a network repository function (NRF) for information about an AMF supporting the multiple-radio network access, receiving, from the NRF, information about at least one AMF supporting the multiple-radio network access, and determining an AMF to perform a
(Continued)

network registration procedure for the terminal, on the basis of the information about the at least one AMF.

14 Claims, 15 Drawing Sheets

(51) Int. Cl.
*H04W 76/15* (2018.01)
*H04W 88/18* (2009.01)
*H04W 88/10* (2009.01)

(56) References Cited

U.S. PATENT DOCUMENTS

| | | | |
|---|---|---|---|
| 10,462,644 B2* | 10/2019 | Ramle | H04W 48/18 |
| 2017/0063686 A1 | 3/2017 | Barrett | |
| 2017/0289271 A1 | 10/2017 | Seed et al. | |
| 2018/0227873 A1 | 8/2018 | Vrzic et al. | |
| 2019/0037407 A1 | 1/2019 | Nair et al. | |
| 2019/0149365 A1 | 5/2019 | Chatterjee et al. | |
| 2019/0159015 A1* | 5/2019 | Qiao | H04L 41/0893 |
| 2019/0166467 A1* | 5/2019 | Livanos | H04W 8/186 |
| 2019/0313236 A1* | 10/2019 | Lee | H04W 88/023 |
| 2019/0357129 A1 | 11/2019 | Park et al. | |
| 2019/0364541 A1* | 11/2019 | Ryu | H04W 80/10 |
| 2020/0053643 A1* | 2/2020 | Lee | H04W 48/18 |
| 2020/0107401 A1* | 4/2020 | Kumar | H04W 48/18 |
| 2020/0163145 A1* | 5/2020 | Park | H04W 76/18 |
| 2020/0178196 A1* | 6/2020 | Wang | H04W 60/005 |
| 2020/0213819 A1 | 7/2020 | Kim | |
| 2020/0221527 A1* | 7/2020 | Bharatia | H04W 76/22 |
| 2020/0275255 A1* | 8/2020 | Wang | H04W 60/04 |
| 2020/0337093 A1 | 10/2020 | Kim et al. | |
| 2021/0274346 A1* | 9/2021 | Suh | H04L 63/205 |
| 2021/0385777 A1* | 12/2021 | Son | H04W 48/18 |
| 2022/0264370 A1* | 8/2022 | Qiao | H04W 60/06 |

FOREIGN PATENT DOCUMENTS

| | | |
|---|---|---|
| CN | 109964509 B | 10/2021 |
| EP | 3 755 116 A1 | 12/2020 |
| KR | 10-2019-0118507 A | 10/2019 |
| WO | 2018/132468 A1 | 7/2018 |
| WO | 2018/206516 A1 | 11/2018 |
| WO | 2019/022442 A2 | 1/2019 |
| WO | 2019/098623 A1 | 5/2019 |
| WO | 2019/160278 A1 | 8/2019 |

OTHER PUBLICATIONS

3rd Generation Partnership Project; Technical Specification Group Services and System Aspects; Procedures for the 5G System (5GS); Stage 2 (Release 16), 3GPP TS 23.502 V16.2.0, Sep. 24, 2019, Sophia Antipolis, France.
Tencent, NRF Discovery Service Update, S2-1909537, 3GPP TSG-SA2 Meeting #135, Oct. 4, 2019, Split, HR.
International Search Report dated Feb. 9, 2021, issued in International Application No. PCT/KR2020/015639.
3rd Generation Partnership Project; Technical Specification Group Services and System Aspects; System Architecture for the 5G System (5GS); Stage 2 (Release 16), 3GPP TS 23.501 V16.2.0, XP051784669, Sep. 24, 2019, Valbonne, France.
China Mobile, Update on SMSoNAS procedures to support MT SMS domain selection, S2-183500, SA WG2 Meeting #127, XP051437812, Apr. 10, 2018, Sanya, China.
European Search Report dated Aug. 10, 2022, issued in European Application No. 20884578.4.
Chinese Office Action with English translation dated Apr. 7, 2024; Chinese Appln. No. 202080078217.8.
European Notice of Allowance dated Jun. 17, 2024; European Appln. No. 20 884 578.4-1215.

* cited by examiner

METHOD AND APPARATUS FOR PROVIDING SERVICE IN WIRELESS COMMUNICATION SYSTEM

TECHNICAL FIELD

The disclosure relates to a method and apparatus for providing information exchange between network equipments for service continuity in a wireless communication system.

BACKGROUND ART

To meet the ever-increasing demand with respect to wireless data traffic since the commercialization of the fourth generation (4G) communication system, there have been efforts to develop an advanced fifth generation (5G) system or pre-5G communication system. For this reason, the 5G or pre-5G communication system is also called a beyond 4G network communication system or post long term evolution (LTE) system. The 5G communication system defined by the third generation partnership project (3GPP) is called a new radio (NR) system. Implementation of the 5G communication system using ultrahigh frequency (millimeter wave (mmWave)) bands, e.g., 60 giga hertz (GHz) bands, is being considered to attain higher data transfer rates. To reduce path loss of radio waves and increase a transmission range of radio waves in the ultra-frequency bands, beamforming, massive multiple-input multiple-output (MIMO), full dimensional MIMO (FD-MIMO), array antennas, analog beamforming, and large-scale antenna techniques are under discussion for the 5G communication system and are applied to an NR system. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, advanced coding modulation (ACM0) schemes, e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, is combined with the IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart home, smart buildings, smart cities, smart cars or connected cars, smart grid, health care, smart home appliances and advanced medical services through convergence and combination between existing Information Technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be an example of convergence of 5G and IoT technologies.

DESCRIPTION OF EMBODIMENTS

Technical Problem

In a communication system conforming to the current third generation partnership project (3GPP) standard, the short message service (SMS) has problems of being delivered only through a single SMS function (SMSF) registered for a particular user equipment (UE) (i.e., being unable to change an SMSF already registered for the UE to another SMSF) and being unable to deal with a fault of the SMSF and occurrence of overload. Accordingly, the disclosure proposes a method and apparatus for supporting a change of SMSF.

Solution to Problem

In accordance with an embodiment of the disclosure, a method performed by an access and mobility management function (AMF) in a wireless communication system includes receiving a network registration request message from a terminal, determining whether the terminal requires support for multiple-radio network access, in case that the terminal requires support for the multiple-radio network access, requesting information about an AMF supporting the multiple-radio network access from a network repository function (NRF), receiving, from the NRF, information about at least one AMF supporting the multiple-radio network access, and determining an AMF to perform a network registration procedure for the terminal, based on the information about the at least one AMF.

In accordance with an embodiment of the disclosure, an access and mobility management function (AMF) in a wireless communication system includes a transceiver, and at least one processor, wherein the at least one processor is configured to receive a network registration request message from a terminal, determine whether the terminal requires support for multiple-radio network access, in case that the terminal requires support for the multiple-radio network access, request information about an AMF supporting the multiple-radio network access from a network repository function (NRF), receive, from the NRF, information about at least one AMF supporting the multiple-radio network access, and determine an AMF to perform a network registration procedure for the terminal, based on the information about the at least one AMF.

MODE OF DISCLOSURE

Figure 1A:
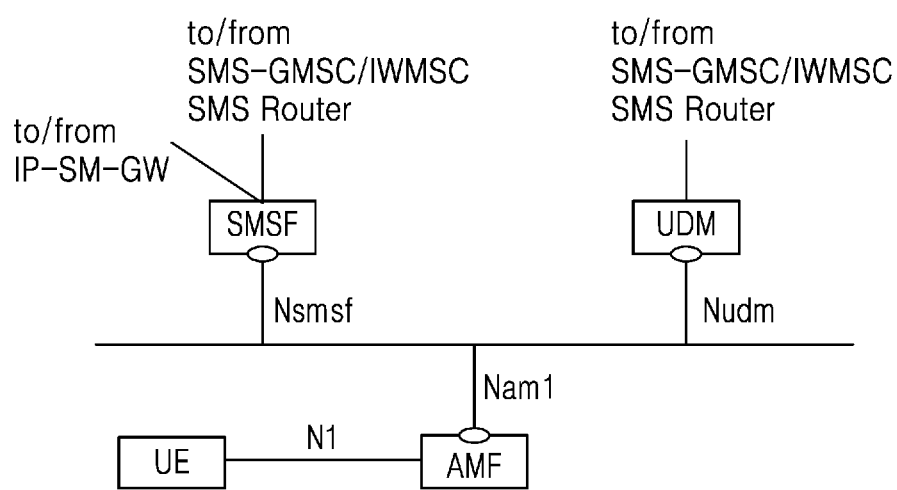
FIG. 1A is a diagram illustrating a structure and functions for providing a short message service (SMS) service in a third generation partnership project (3GPP) fifth generation (5G) system, according to an embodiment of the disclosure.

Embodiments of the disclosure will now be described in detail with reference to accompanying drawings. In the description of the disclosure, when it is determined that a detailed description of associated commonly-used technologies or structures may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executable by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Descriptions of some well-known technologies that possibly obscure the disclosure will be omitted, if necessary. Embodiments of the disclosure will now be described with reference to accompanying drawings.

Herein, terms to identify access nodes, terms to refer to network entities, terms to refer to messages, terms to refer to interfaces among network entities, terms to refer to various types of identification information, etc., are examples for convenience of explanation. Accordingly, the disclosure is not limited to the terms as herein used, and may use different terms to refer to the items having the same meaning in a technological sense.

Some of the terms and names defined by the 3rd generation partnership project (3GPP) long term evolution (LTE) rules will be used hereinafter. The disclosure is not, however, limited to the terms and definitions, and may equally apply to any systems that conform to other standards. In the disclosure, eNode B (eNB) may be interchangeably used with gNode B (gNB). For example, a base station referred to as an eNB may also indicate a gNB. Furthermore, the term 'terminal' or 'user equipment (UE)' may refer not only to a cell phone, an NB-IoT device, and a sensor but also to other wireless communication devices.

In the following description, a base station is an entity for performing resource allocation for a terminal, and may be at least one of a gNB, an eNB, a Node B, a base station (BS), a radio access unit, a base station controller, or a network node. The terminal may include a UE, a mobile station (MS), a cellular phone, a smart phone, a computer, or a multimedia system capable of performing a communication function. It is, of course, not limited thereto.

Especially, the disclosure may be applied to the 3GPP new radio (NR) (which is the 5G mobile communication standard). The disclosure may be applied to intelligent services based on the 5G communication and IoT related technologies, e.g., smart homes, smart buildings, smart cities, smart cars, connected cars, health care, digital education, smart retail, and security and safety services. In the disclosure, eNB may be interchangeably used with gNB. For example, a base station referred to as an eNB may also indicate a gNB. Furthermore, the term 'terminal' or 'user equipment (UE)' may refer not only to a cell phone, an NB-IoT device, and a sensor but also to other wireless communication devices.

FIG. 1A is a diagram illustrating a structure and functions for providing a short message service (SMS) service (i.e., a short message transfer service between UEs) in a third generation partnership project (3GPP) fifth generation (5G) system, according to an embodiment of the disclosure.

In a 5G system, an SMS function (SMSF) performs a role of delivering a mobile originated (MO) SMS (i.e., an SMS originated from a UE) and a mobile terminated (MT) SMS (i.e., an SMS destined for a UE). The SMSF to process the SMS of the UE is selected and stored by an access and mobility management function (AMF) in a UE registration procedure. Furthermore, the selected SMSF is registered in a user data management (UDM). After registration of the SMSF, the MO SMS is delivered in a sequence of the AMF, the SMSF, and an SMS gateway mobile switching center (SMS-GMSC) in FIG. 1A. In this case, the AMF forwards the MO SMS to an SMSF stored for the UE in the registration procedure. The MT SMS is delivered in a sequence of the SMS-GMSC, the SMSF, the AMF, and the UE in FIG. 1A. In this case, the SMS-GMSC queries about an SMSF for the UE to the UDM and then forwards the MT SMS to the corresponding SMSF.

In the traditional 3GPP 5G system, the SMS may be forwarded only to a single SMSF obtained in the UE registration procedure and it is not possible to change the SMSF, so there is a need for a method of dealing with a case where it is not possible to use the single SMSF already registered.

The disclosure proposes a method and apparatus for the AMF to change the SMSF for delivering an SMS of the UE. In the meantime, in an embodiment of the disclosure, provided are the following two architectures to support a change of SMSF.

Figure 1B:
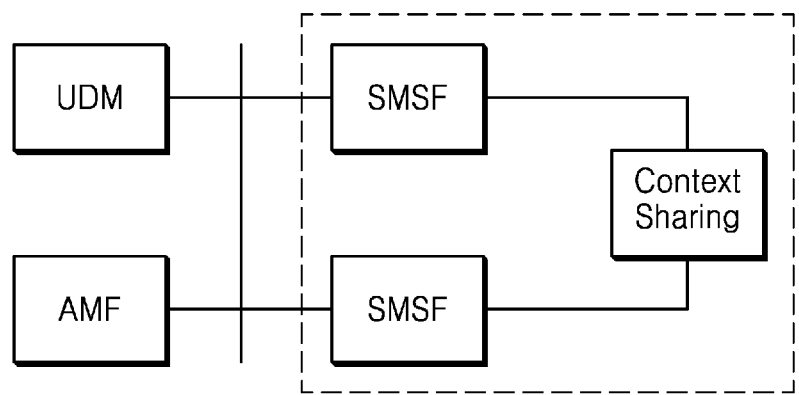
FIG. 1B is a diagram illustrating an architecture using an SMS function (SMSF) set to provide an SMS service, according to an embodiment of the disclosure.

1) an architecture using an SMSF set that shares an SMS context for the UE
2) an architecture in which an SMS context for the UE is transmitted or received and processed between SMSFs FIG. 1B is a diagram illustrating an architecture using an SMS function (SMSF) set to provide an SMS service, according to an embodiment of the disclosure.

The SMSF set may refer to a set of SMSF instances (operating SMSF entities) that are able to provide an interchangeable, i.e., identical, service. The SMSF instances in the SMSF set share a UE context for providing an SMS service with one another. In the SMSF set based method, it is assumed that in registration of information about an SMSF to the UDM, information about one or more backup SMSFs that may replace the corresponding SMSF are also registered or that all the SMSF instances belonging to the same SMSF set provide the same service. In this case, the backup SMSF is selected from within the same SMSF set as the SMSF to be registered.

To describe problematic situations of the disclosure and embodiments to solve them, an SMSF will be assumed as an NF to work with an AMF to provide the SMS service, but the embodiments of the disclosure will be equally applied to other NFs. For example, when the embodiments of the disclosure are applied to a policy control function (PCF) that works with the AMF to provide policy information or a network exposure function (NEF) that supports service information exchange with an external network, the basic concept, structure, or operation, yet with a difference in name of the NF or service name used by the NF may be applied.

Figure 1C:
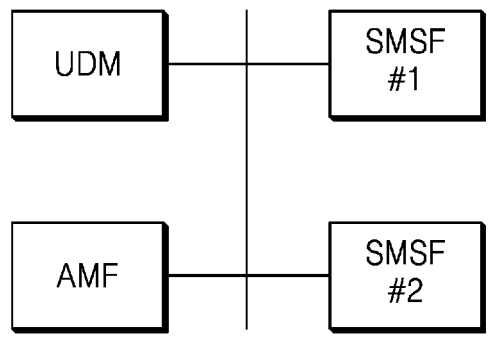
FIG. 1C is a diagram illustrating an architecture not using an SMSF set but using an SMS context transfer to provide an SMS service, according to an embodiment of the disclosure.

FIG. 1C is a diagram illustrating an architecture not using an SMSF set but using an SMS context transfer to provide an SMS service, according to an embodiment of the disclosure.

A method that uses SMS context transfer may be classified into a method that performs direct context transfer between SMSFs and a structure that does not support context transfer between SMSFs. In the structure that supports context transfer, a procedure for performing context transfer to a new SMSF from the existing SMSF is defined. On the other hand, in the structure that does not perform context transfer, the procedure for performing context transfer to a new SMSF from the existing SMSF may be omitted. Instead, the new SMSF may create a new UE context for providing the SMS when there is a change in SMSF.

Various embodiments for supporting SMSF changes while the UE is registered in the 3GPP 5G system will now be described.

Figure 2:
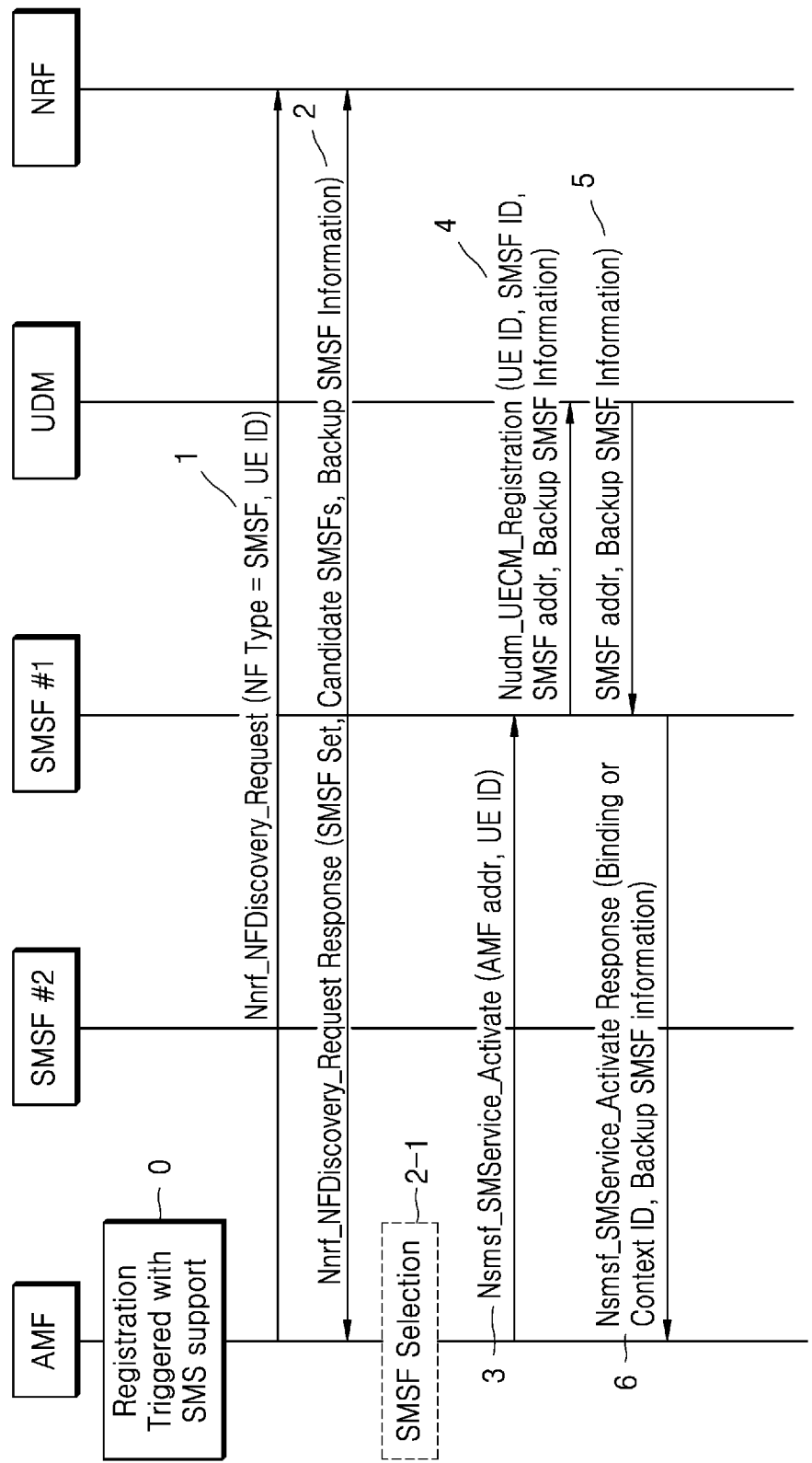
FIG. 2 is a sequence diagram illustrating a procedure for registering a backup SMSF to support a change of SMSF based on an SMSF set, according to an embodiment of the disclosure.

FIG. 2 is a sequence diagram illustrating a procedure for registering a backup SMSF to support a change of SMSF based on an SMSF set, according to an embodiment of the disclosure.

The SMSF set refers to a set of SMSF instances (operating SMSF entities) that are replaced by one another, and the SMSF instances in the SMSF set share a context required for providing the SMS service to the UE with one another.

Operation 0. In a case of supporting the SMS through a non-access stratum (NAS) message, the UE may notify an AMF of whether to support SMS transmission through NAS (SMS over NAS indication) to receive the SMS service when performing a registration procedure to the AMF.

Operation 1. When provision of an SMS over NAS service for the UE is required (when the AMF receives the SMS over NAS indication from the UE and subscription information obtained through a UDM includes the provision of SMS over NAS), the AMF performs a procedure for selecting an SMSF. In this case, when discovery/selection through a network repository function (NRF) is required, the AMF may put an NF type set to the SMSF, a subscriber/UE ID (for example, a subscription permanent identifier (SUPI), an international mobile subscriber identity (IMSI) or a generic public subscription identifier (GPSI). Hereinafter, it corresponds to any UE ID as mentioned above) in a request message Nnrf_NFDiscovery_Request to be sent to the NRF. When the AMF is able to indicate an SMSF set for a particular SMSF, the request message Nnrf_NFDiscovery_Request may include an SMSF set ID, and the AMF may also put a backup SMSF request in the request message Nnrf_NFDiscovery_Request to obtain explicit information about the backup SMSF together.

Operation 2. The NRF may put the SMSF set and information about candidate SMSFs in a response Nnrf_NFDiscovery_Request Response to the request. When the request message received in Operation 1 includes the backup SMSF request or the NRF is configured to send the backup SMSF information together, the NRF may put the backup SMSF information in the response message. The information about the SMSF set may be comprised of information about SMSF instances (operating SMSF entities) that are replaced by one another, and may include an ID of the selected SMSF set. The information about the candidate SMSFs may include a list of SMSF instances included in the selected SMSF set, and may include an ID or an address for each SMSF instance. The backup SMSF information may be comprised of information about one SMSF instance among the candidate SMSFs or information about one SMSF instance in the SMSF set, and may be allocated for each UE. When the NRF selects candidate SMSFs and a backup SMSF, a load state of the SMSF instance, and a network condition (e.g., a network delay time, etc.) between the SMSF instance and the requesting AMF may be taken into account.

Operation 2-1. The AMF selects an SMSF to which to transmit an SMS service activate message for the UE. For example, the AMF may select an SMSF to which to transmit the SMS service activate message based on the information included in Nnrf_NFDiscovery_Request Response. Specifically, the AMF selects one SMSF instance among the candidate SMSFs. In this case, a load of the SMSF instance, and a network condition (e.g., a network delay time, etc.) between the SMSF instance and the AMF may be taken into account.

Operation 3. The AMF transmits a message for activating the SMS service, Nsmsf_SMService_Activate, to the SMSF instance selected in Operation 2-1. This message may include an address of the AMF and an ID of the subscriber (UE) to be a target, and may also include backup SMSF information. In this case, the AMF may create a binding ID for the SMSF and send it to the selected SMSF instance.

Operation 4. SMSF #1 may transmit a request message Nudm_UECM_Registration Request for registering SMSF information for the UE in the UDM, and a backup SMSF (e.g., SMSF #2) may be registered together during the registration procedure. In this case, UDM discovery may be performed based on the UE ID. The registration request message includes the UE ID, the SMSF ID, the SMSF address, and the backup SMSF information. SMSF #1 sets the UE ID to be the UE ID received in Operation 3 and sets the SMSF ID and the SMSF address to its own SMSF ID and SMSF address. When the NRF has configured backup SMSF information in Operation 2, the backup SMSF information may be set to the information (the backup SMSF information configured in Operation 2 is obtained from the NRF or in Operation 3). When the NRF has not configured backup SMSF information, the backup SMSF information may be set to a piece of SMSF instance information in the same SMSF set with the SMSF (i.e., SMSF #1) or set to one of the candidate SMSFs. On receiving the registration request message, the UDM may store the SMSF information (SMSF ID and SMSF address) for the UE (identified with the UE ID included in the registration request message), and configure the backup SMSF instance for the UE with the backup SMSF information in the registration message. The message Nudm_UECM_Registration Request may include a binding ID created by the SMSF for the UDM/UDR.

Operation 5. The UDM sends user subscription information relating to the SMS service (UE SMS subscription data) to SMSF #1 in a response message Nudm_UECM_Registration Response. SMSF #1 creates SMS service user information (UE SMS context) and a UE SMS context ID based on the information received from the AMF and the subscription information received from the UDM. The UE SMS context may be identified through the UE SMS context ID for identifying a context created for each subscriber or binding IDs with the respective AMF/UDM that have exchanged messages during the registration procedure, and the UE SMS context may include such identifiers. In the embodiment, the UE SMS context may be shared with the backup SMSF or may be shared between instances in the same SMSF set.

The previous operations are described on the assumption that a consumer creates and sends the binding ID, but on the contrary, it may also be supported that a producer creates the binding ID after receiving a request from the consumer and notify the consumer.

Operation 6. SMSF #1 transmits a response message Nsmsf_SMService_Activate Response to the AMF in response to the request for providing the SMS service received in Operation 3. The message Nsmsf_SMService_Activate Response may include one or more of the binding IDs, the UE SMS context ID, and the backup SMSF information as described in Operation 5. Upon reception of an SMS from the UE, the AMF may put the SMS and the UE SMS context ID or the binding ID to a request for forwarding the SMS and send the request to SMSF #1. On receiving the SMS and the UE SMS context ID or the binding ID from the AMF, the SMSF may identify a UE SMS context based on the UE SMS context ID or the binding ID, and process the SMS based on the UE SMS context.

Figure 3:
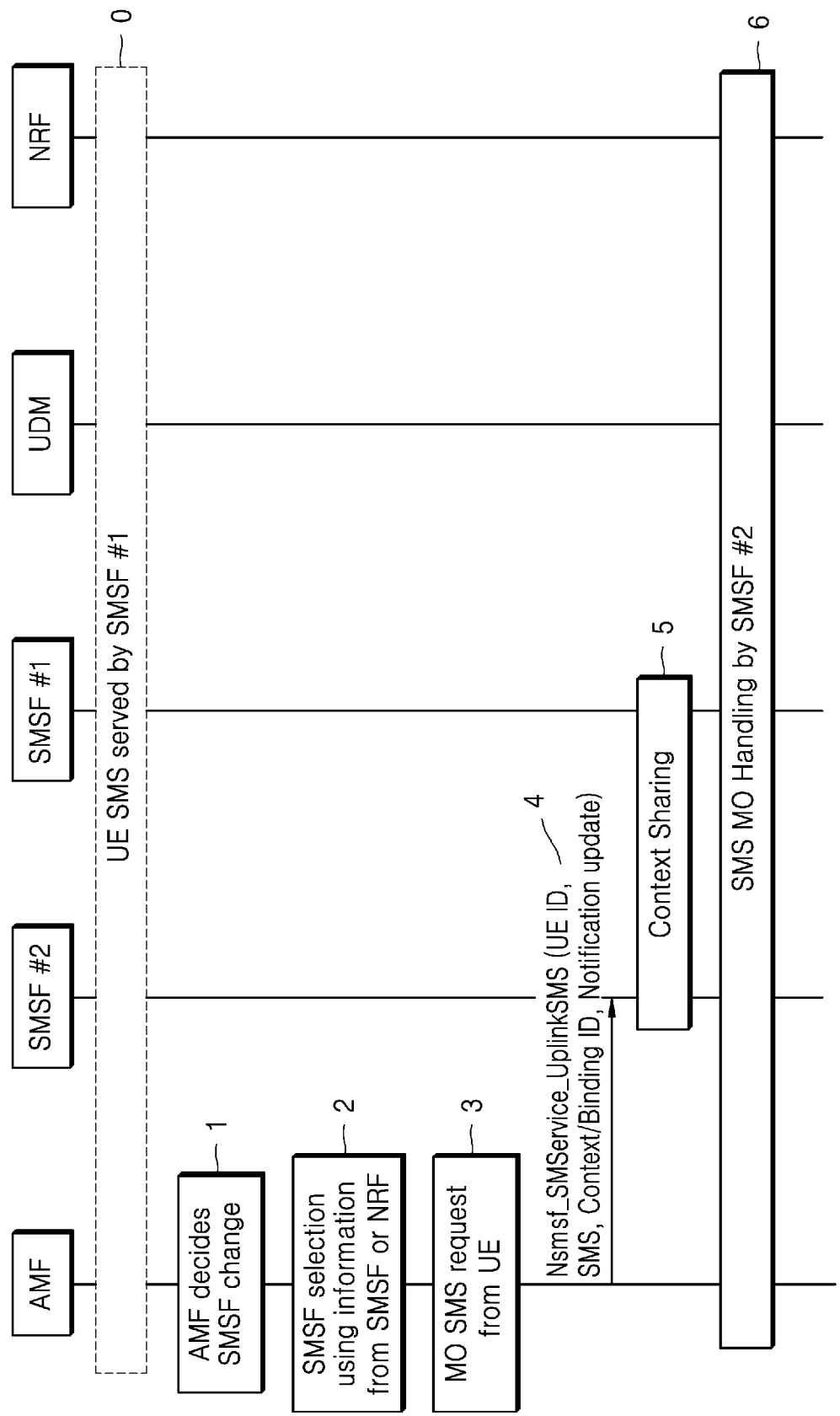
FIG. 3 is a sequence diagram illustrating an SMSF change procedure and a mobile originated (MO) SMS handling procedure by an AMF based on an SMSF set, according to an embodiment of the disclosure.

FIG. 3 is a sequence diagram illustrating an SMSF change procedure and a mobile originated (MO) SMS handling procedure by an AMF based on an SMSF set, according to an embodiment of the disclosure.

In FIG. 3, illustrated is a procedure for changing SMSFs for processing a mobile originated (MO) SMS and for processing the MO SMS by the AMF after backup SMSF registration based on an SMSF set.

Operation 0. A registration procedure may be performed so that an SMS service is provided to the UE (subscriber) through SMSF #1.

Operation 1. The AMF determines to change the SMSF. A change of SMSF may be made when the AMF is changed due to movement of the UE, when the existing SMSF has a fault, or for a load distribution purpose.

Operation 2. The AMF may determine or select a new SMSF by using information received from the SMSF or an NRF. When backup SMSF information is configured in a UE context, the AMF may determine a new SMSF using the backup SMSF information or select an SMSF in the existing SMSF set. When information for selecting an SMSF is required, the AMF may obtain an SMSF address through the NRF, and the AMF may transmit a request message including an SMSF set ID to the NRF. Furthermore, the AMF may put a backup SMSF request in the request message to obtain backup SMSF information for the existing SMSF.

Operation 3. The AMF may receive a MO SMS delivery request from the UE.

Operation 4. The AMF sends an SMS transmission request message Nsmsf_SMService_UplinkSMS to the new SMSF (i.e., SMSF #2). In this case, the message to be sent may include an ID of the subscriber, an SMS, and a context ID or an AMF binding ID created with the existing SMSF. Furthermore, the SMS transmission request message Nsmsf_SMService_UplinkSMS may notify SMSF #2 through a notification update parameter that it is the AMF that is going to receive notifications that may occur for the UE. The AMF may start a timer to transmit Nsmsf_SMService_UplinkSMS to the new SMSF (i.e., SMSF #2), and when the message Nsmsf_SMService_UplinkSMS Response fails to arrive within a preset time T_Request, the AMF may reselect one of the SMSFs obtained in operation 2 to transmit Nsmsf_SMService_UplinkSMS, or restart from Operation 2.

Operation 5. SMSF #2 obtains common UE SMS context information by using the UE SMS context ID, the AMF binding ID, or the subscriber ID, or retrieve the UE SMS context information. Furthermore, SMSF #2 may perform updating of information instructing the UDM/UDR to use its address for processing the MT SMS for the UE.

Operation 6. SMSF #2 processes an SMS for the UE.

Figure 4:
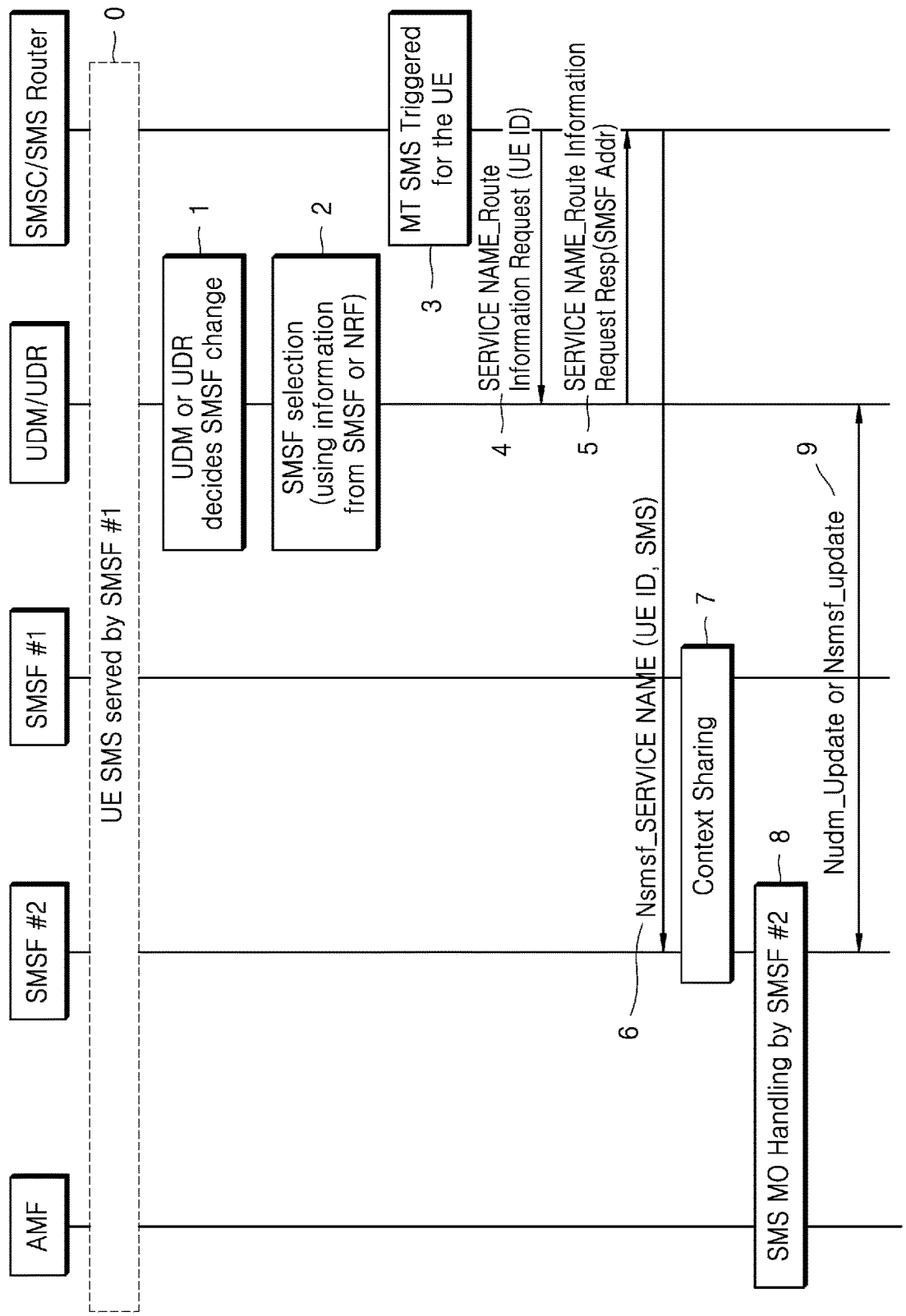
FIG. 4 is a sequence diagram illustrating an SMSF change procedure and a mobile terminated (MT) SMS handling procedure by a unified data management (UDM) based on an SMSF set, according to an embodiment of the disclosure.

FIG. 4 is a sequence diagram illustrating an SMSF change procedure and an MT SMS handling procedure by a UDM based on an SMSF set, according to an embodiment of the disclosure.

FIG. 4 illustrates a procedure for changing SMSFs and processing an MT SMS by a UDM/UDR after registration of a backup SMSF based on an SMSF set.

Operation 0. A registration procedure may be performed so that an SMS service is provided to the UE (subscriber) through SMSF #1.

Operation 1. A UDM (or UDR) determines to change SMSFs. The change of SMSF may be performed e.g., when the existing SMSF has a fault, or to distribute the load.

Operation 2. The UDM (or UDR) may determine or select a new SMSF by using information received from an SMSF or an NRF. When backup SMSF information is configured in information stored, the UDM/UDR may determine a new SMSF using the backup SMSF information or select an SMSF in the existing SMSF set. When information for selecting an SMSF is required, the UDM/UDR may obtain an SMSF address through the NRF, and the UDM/UDR may transmit a request message including an SMSF set ID to the NRF. Furthermore, the UDM/UDR may put a backup SMSF request in the request message to obtain backup SMSF information for the existing SMSF. The UDM/UDR may notify the new SMSF (SMSF #2) that there has been a change of SMSF for the subscriber, and transmit a message indicating that it is an entity concerned to receive notifications related to the SMS for the UE.

Operation 3. An SMS center (SMSC) or an SMS router receives an MT SMS (an SMS to the UE) delivery request. The request may include a subscriber (UE) ID and an SMS.

Operation 4. The SMS center or the SMS router transmits, to the UDM/UDR, a message Send Route Info for SM (e.g., Nudm_Route Information Request or Nudr_Route Information Request) to discover an SMSF to forward the SMS of the UE. The message to discover an SMSF includes the UE ID.

Operation 5. The UDM/UDR may transmit a response message (e.g., Nudm_Route Information Request Response or Nudr_Route Information Request Response) to the request message received in Operation 4 to the SMS center or the SMS router. The response message may include an address of the newly set SMSF (i.e., SMSF #2) in the UE ID. The response message may further include the UE SMS context ID or UDM/UDR binding ID created in the registration procedure.

Operation 6. The SMS center or the SMS router performs an SMS transmission request Forward MT SMS (e.g., Nsmsf_SMService_DownlinkSMS) to the new SMSF (i.e., SMSF #2). The SMS transmission request message includes the UE ID and the SMS. Furthermore, the SMS transmission request message may include the UE SMS context ID or the binding ID received in Operation 5. The SMS center or the SMS router may store an SMSF address for the UE ID. The SMS center or the SMS router may start a timer to transmit the message Forward MT SMS to the new SMSF (i.e., SMSF #2), and when the message Forward MT SMS fails to arrive within a preset time T_Request, the SMS center or the SMS router may reselect one of the SMSFs obtained in Operation 2 to transmit the message Forward MT SMS, or restart from Operation 2.

Operation 7. The SMS #2 obtains context information corresponding to a common UE SMS context with the UE SMS context ID or the binding ID included in the message received from the SMS center or the SMS router, or retrieves a context by using an ID of the subscriber. Furthermore, SMSF #2 may perform notification update for the UDM/UDR. Furthermore, SMSF #2 may perform updating of information instructing the AMF to use its address for processing the MO SMS.

Operation 8. SMSF #2 may forward the SMS received in Operation 6 to the AMF, and when required, may request the AMF for a service so that the UE becomes a reachable state.

Operation 9. SMSF #2 may explicitly notify that a change of SMSF has been made, and transmit a Nudm_UECM_Registration request to the UDM for notification and MT SMS processing. SMSF #2 may select a backup SMSF from within the same SMSF set with itself or obtain the back SMSF from the NRF, and put information about the backup SMSF in Nudm_UECM_Registration request to the UDM.

Figure 5:
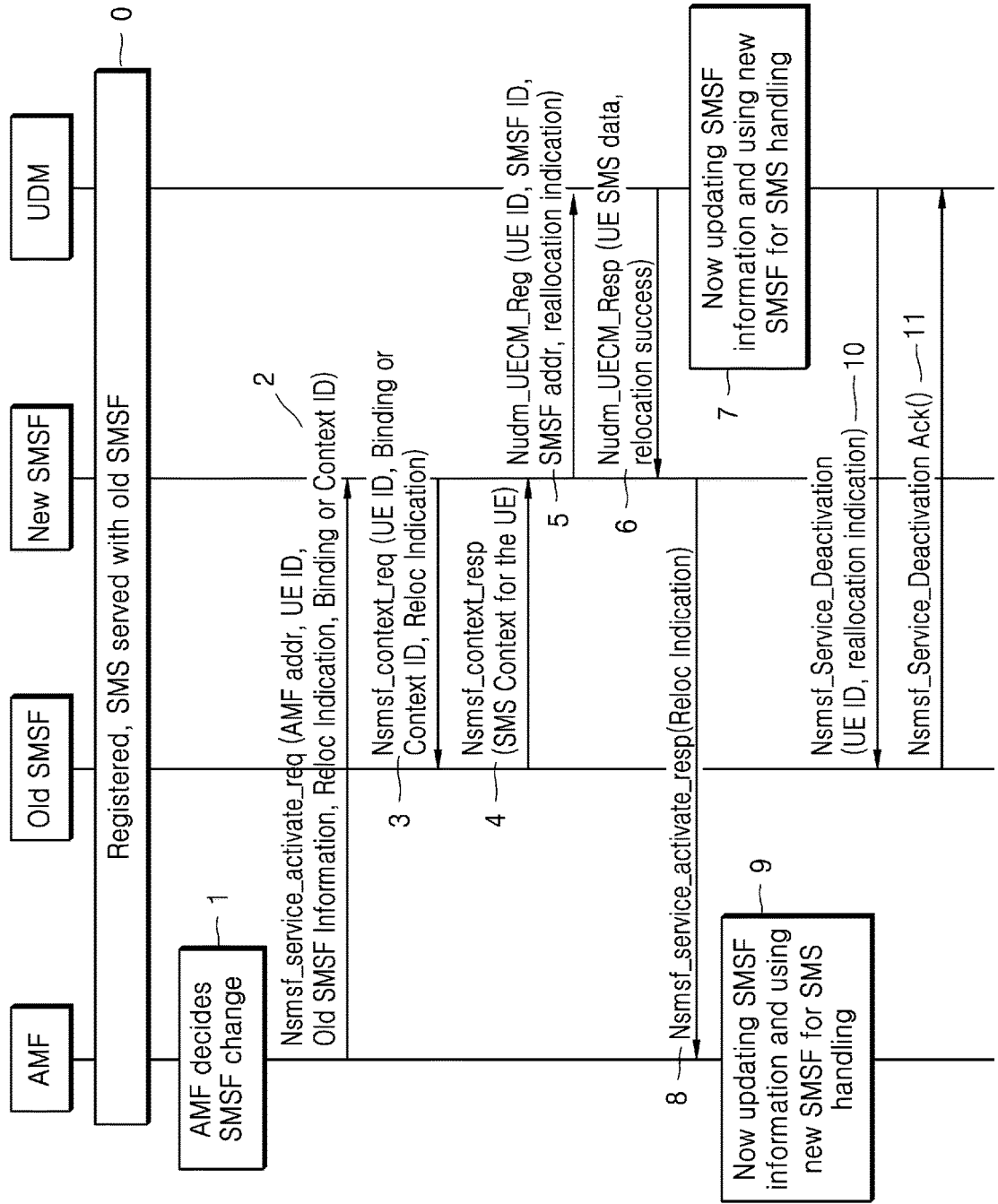
FIG. 5 is a sequence diagram illustrating an SMSF change procedure by an AMF and a procedure for deactivating an existing SMSF by a UDM based on context transfer, according to an embodiment of the disclosure.

FIG. 5 is a sequence diagram illustrating an SMSF change procedure by an AMF and a procedure for deactivating an existing SMSF by a UDM based on context transfer, according to an embodiment of the disclosure.

Operation 0. An SMSF may be registered so that an SMS service is provided for the UE (subscriber). During the registration procedure, the SMS service for the UE is configured to be supported by the old SMSF.

Operation 1. The AMF determines to change the SMSF. A change of SMSF may be made when the AMF is changed due to movement of the UE, when the existing SMSF has a fault, or for a load distribution purpose. When backup SMSF information is configured in a UE context, the AMF may determine a new SMSF using the backup SMSF information or select an SMSF in the existing SMSF set. When information for selecting an SMSF is required, the AMF may obtain an SMSF address through the NRF, and the AMF may transmit a request message including an SMSF set ID to the NRF. Furthermore, the AMF may put a backup SMSF request in the request message to obtain backup SMSF information for the existing SMSF.

Operation 2. The AMF transmits an SMS service activation message Nsmsf_SMService_Activate_req to the selected new SMSF instance. The SMS service activation message Nsmsf_SMService_Activate_req includes an AMF address and a UE ID. Furthermore, the SMS service activation message Nsmsf_SMService_Activate_req may include old SMSF information and a binding or context ID for receiving a UE context previously created. The SMS service activation message may additionally include a relocation indication to indicate that the SMSF has changed and that the change is in progress. The AMF may start a timer to transmit the message Nsmsf_SMService_Activate request to the new SMSF, and when a response message Nsmsf_SMService_Activate response fails to arrive within a preset time T_Request, the AMF may reselect one of the SMSFs obtained in Operation 2 to transmit the message Nsmsf_SMService_Activate, or restart from selection of an SMSF of Operation 1. Operation 3. The new SMSF transmits a message Nsmsf_context_transfer request for context request to the old SMSF with an address obtained from the old SMSF information. In this case, the new SMSF includes a context ID or a binding ID in the Nsmsf_context_transfer request and requests corresponding context information from the old SMSF. The relocation indication may be used to indicate that the SMSF has changed and that the change is being in progress.

Operation 4. The old SMSF transmits context information corresponding to the UE SMS context ID or biding ID created in Operation 0 to the new SMSF in Nsmsf_context_transfer response in response to the context request message Nsmsf_context_transfer request.

Operation 5. The new SMSF may perform registration to the UDM through a request message (e.g., Nudm_UECM_Registration). The request message Nudm_UECM_Registration includes a UE ID, an SMSF ID (of the new SMSF), an SMS address (of the new SMSF), and a relocation indication. The relocation indication may be used to indicate that the SMSF has changed and that the change is being in progress. In a case that a value of the relocation indication is set, the UDM may only delete the relocation indication without deleting information about the new SMSF when receiving a de-registration request rather than relocation as a reason from the other SMSF.

Operation 6. The UDM may transmit a response Nudm_UECM_Registration Response that an SMSF for the UE has been changed from the old SMSF to the new SMSF. The UDM may put user subscription information relating to the SMS service (UE SMS subscription data) in the response message Nudm_UECM_Registration Response as required.

Operation 7. Subsequently, the UDM may respond with an SMSF to deal with an occasion when an MT SMS occurs as the new SMSF.

Operation 8. The new SMSF may transmit a response message Nsmsf_SMService_Activate response to the AMF in response to the SMS service activation message received in Operation 2. The new SMSF may put relocation indication indicating that the SMSF has changed in the response message.

Operation 9. Subsequently, the AMF may update the UE context, change the SMSF to process the SMS from the old SMSF to the new SMSF, and notify the new SMSF that it is an AMF to receive notifications that may occur for the UE.

Operation 10. After a successful change of SMSF (Operation 7), the UDM transmits an SMS service deactivation message Nsmsf_Service_Deactivation including the UE ID and the relocation indication to the old SMSF. The UDM may notify the old SMSF of deactivation caused by the change of SMSF through the relocation indication.

Operation 11. The old SMSF notifies that deactivation is completed by transmitting a message Nsmsf_Service_Deactivation ACK to the UDM. Furthermore, the old SMSF may delete the UE context immediately or a predetermined time T after receiving the message Nsmsf_Service_Deactivation.

Figure 6:
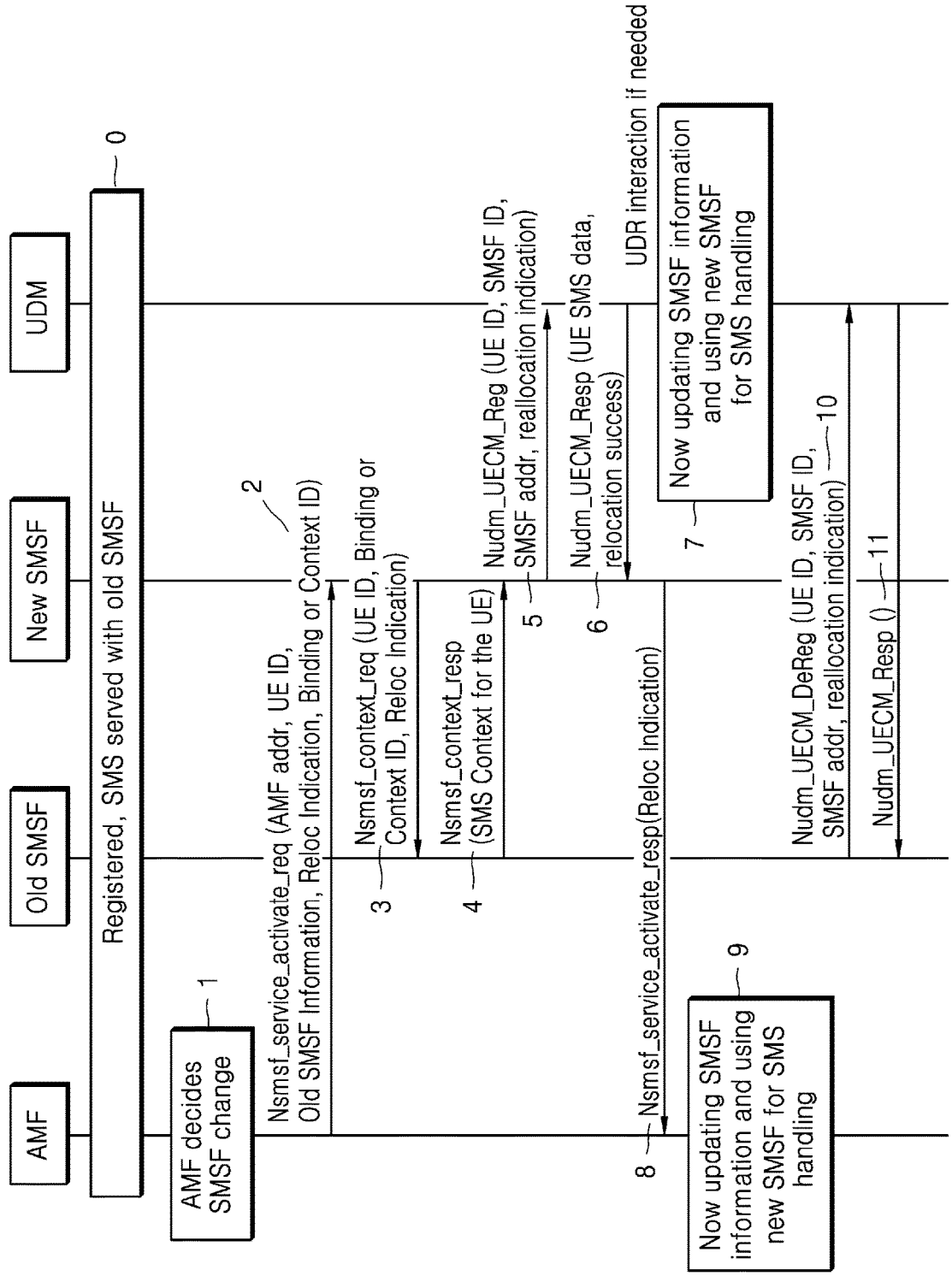
FIG. 6 is a sequence diagram illustrating an SMSF change procedure by an AMF and a procedure for deactivating an existing SMSF by the AMF based on context transfer, according to an embodiment of the disclosure.

FIG. 6 is a sequence diagram illustrating an SMSF change procedure by an AMF and a procedure for deactivating an existing SMSF by the AMF based on context transfer, according to an embodiment of the disclosure.

Operation 0. An SMSF may be registered so that an SMS service is provided for the UE (subscriber). During the registration procedure, the SMS service for the UE is configured to be supported by the old SMSF.

Operation 1. The AMF determines to change the SMSF. A change of SMSF may be made when the AMF is changed due to movement of the UE, when the existing SMSF has a fault, or for a load distribution purpose. When backup SMSF information is configured in a UE context, the AMF may determine a new SMSF using the backup SMSF information or select an SMSF in the existing SMSF set. When information for selecting an SMSF is required, the AMF may obtain an SMSF address through the NRF, and the AMF may transmit a request message including an SMSF set ID to the NRF. Furthermore, the AMF may put a backup SMSF request in the request message to obtain backup SMSF information for the existing SMSF.

Operation 2. The AMF transmits an SMS service activation message Nsmsf_SMService_Activate to the selected new SMSF instance. The SMS service activation message Nsmsf_SMService_Activate includes an AMF address and a UE ID. Furthermore, the SMS service activation message Nsmsf_SMService_Activate may include old SMSF information and a binding or context ID for receiving a UE context created previously. The SMS service activation message Nsmsf_SMService_Activate may additionally include a relocation indication to indicate that the SMSF has changed and that the change is in progress. The AMF may start a timer to transmit the message Nsmsf_SMService_Activate to the new SMSF, and when a response message Nsmsf_SMService_Activate response fails to arrive within a preset time T_Request, the AMF may reselect one of the SMSFs obtained in Operation 2 to transmit the message Nsmsf_SMService_Activate, or restart from selection of an SMSF of Operation 1.

Operation 3. The new SMSF transmits a message Nsmsf_context_transfer request for context request to the old SMSF with an address obtained from the old SMSF information. In this case, the new SMSF includes a context ID or a binding ID in the Nsmsf_context_transfer request and requests corresponding context information from the old SMSF. The relocation indication may be used to indicate that the SMSF has changed and that the change is being in progress.

Operation 4. The old SMSF transmits context information corresponding to the UE SMS context ID or biding ID created in Operation 0 to the new SMSF in Nsmsf_context_transfer response in response to the context request message Nsmsf_context_transfer request.

Operation 5. The new SMSF may perform registration to the UDM through a request message (e.g., Nudm_UECM_Registration). The request message Nudm_UECM_Registration includes a UE ID, an SMSF ID (of the new SMSF), an SMS address (of the new SMSF), and a relocation indication. The relocation indication may be used to indicate that the SMSF has changed and that the change is being in progress. In a case that a value of the relocation indication is set, the UDM may only delete the relocation indication from information about the new SMSF when receiving a de-registration request having a reason for relocation from the other SMSF.

Operation 6. The UDM may transmit a response message Nudm_UECM_Registration response that an SMSF for the UE has been changed from the old SMSF to the new SMSF. The UDM may put user subscription information relating to the SMS service (UE SMS subscription data) in the response message Nudm_UECM_Registration response as required.

Operation 7. Subsequently, the UDM may respond with an SMSF to deal with an occasion when an MT SMS occurs as the new SMSF.

Operation 8. The new SMSF may transmit a response message Nsmsf_SMService_Activate response to the AMF in response to the SMS service activation message received in Operation 2. The new SMSF may put relocation indication indicating that the SMSF has changed in the response message Nsmsf_SMService_Activate response.

Operation 9. Subsequently, the AMF changes the SMSF from the old SMSF to the new SMSF for handling the SMS by updating the UE context.

Operation 10. The old SMSF transmits a de-registration Nudm_UECM_DeRegistration request message to the UDM after transmission of the context (Operation 4). To avoid collision with the registration request of the new SMSF, the old SMSF may wait for a certain time and transmit the de-registration request. The de-registration request message Nudm_UECM_DeRegistration includes a UE ID, an SMSF ID (of the old SMSF), an SMSF address (of the old SMSF), and a relocation indication. The relocation indication is included in the de-registration request message Nudm_UECM_DeRegistration to notify the UDM that a reason for de-registration is the change of SMSF.

Operation 11. The UDM may delete the SMSF information at the request of the old SMSF. The UDM may not delete registration information of the other SMSF (the new SMSF in the embodiment) when the registration indication is included in the de-registration request message Nudm_UECM_DeRegistration. Subsequently, the fact that de-registration is completed is notified by transmitting Nudm_UECM_DeRegistration response to the old SMSF.

Figure 7:
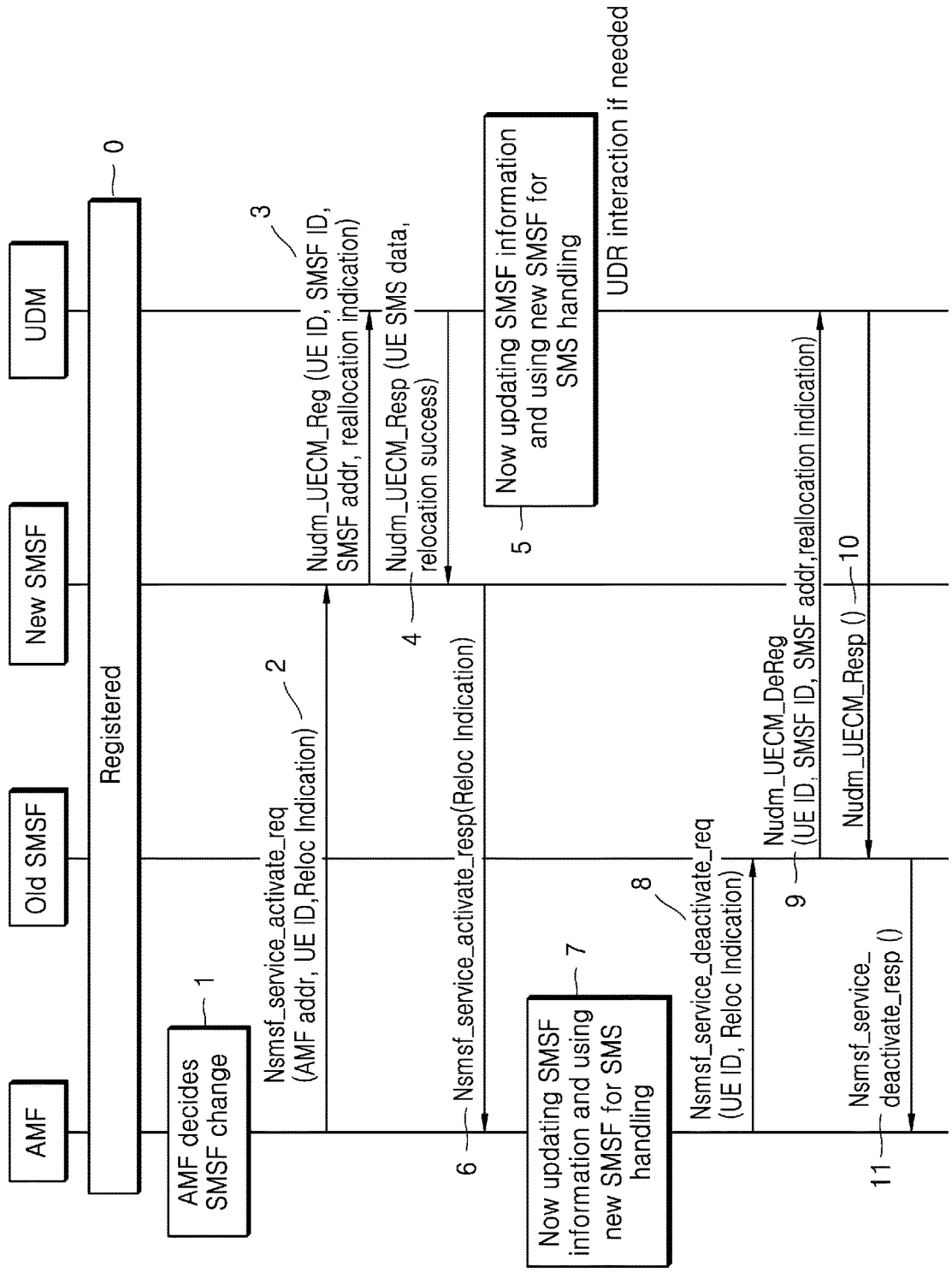
FIG. 7 is a sequence diagram illustrating an SMSF change procedure by an AMF and a procedure for deactivating an existing SMSF by the AMF without using context transfer, according to an embodiment of the disclosure.

FIG. 7 is a sequence diagram illustrating an SMSF change procedure by an AMF and a procedure for deactivating an existing SMSF by the AMF without using context transfer, according to an embodiment of the disclosure.

Operation 0. An SMSF may be registered so that an SMS service is provided for the UE (subscriber). During the registration procedure, the SMS service for the UE is configured to be supported by the old SMSF.

Operation 1. The AMF determines to change the SMSF. A change of SMSF may be made when the AMF is changed due to movement of the UE, when the existing SMSF has a fault, or for a load distribution purpose. When backup SMSF information is configured in a UE context, the AMF may determine a new SMSF using the backup SMSF information or select an SMSF in the existing SMSF set. When information for selecting an SMSF is required, the AMF may obtain an SMSF address through the NRF, and the AMF may transmit a request message including an SMSF set ID to the NRF. Furthermore, the AMF may put a backup SMSF request in the request message to obtain backup SMSF information for the existing SMSF.

Operation 2. The AMF transmits an SMS service activation message Nsmsf_SMService_Activate to the selected new SMSF instance. The SMS service activation message Nsmsf_SMService_Activate includes an AMF address and a UE ID. Furthermore, the SMS service activation message Nsmsf_SMService_Activate may include old SMSF information and a binding or context ID for receiving a UE context created previously. The SMS service activation message Nsmsf_SMService_Activate may additionally include a relocation indication to indicate that the SMSF has changed and that the change is in progress. The AMF may start a timer to transmit the message Nsmsf_SMService_Activate to the new SMSF, and when a response message Nsmsf_SMService_Activate response fails to arrive within a preset time T_Request, the AMF may reselect one of the SMSFs obtained in Operation 2 to transmit the message Nsmsf_SMService_Activate, or restart from selection of an SMSF of Operation 1.

Operation 3. The new SMSF may perform registration to the UDM through a request message (e.g., Nudm_UECM_Registration). The request message Nudm_UECM_Registration includes a UE ID, an SMSF ID (of the new SMSF), an SMS address (of the new SMSF), and a relocation indication. The relocation indication may be used to notify the new SMSF that the SMSF has changed and that the change is in progress. In a case that a value of the relocation indication is set, the UDM may only delete the relocation indication from information about the new SMSF when receiving a de-registration request having a reason for relocation from the other SMSF.

Operation 4. The UDM may transmit, to the new SMSF, a response that an SMSF for the UE is registered as a new SMSF. The response message Nudm_UECM_Registration response may include user subscription information relating to the SMS service (UE SMS subscription data) for the new SMSF to create a context for providing the SMS service.

Operation 5. Subsequently, the UDM may respond with an SMSF to deal with an occasion when an MT SMS occurs as the new SMSF.

Operation 6. The new SMSF may transmit a response message Nsmsf_SMService_Activate response to the AMF in response to the SMS service activation message received in Operation 2. The new SMSF may put relocation indication indicating that the SMSF has changed in the response message Nsmsf_SMService_Activate response.

Operation 7. Subsequently, the AMF changes the SMSF from the old SMSF to the new SMSF for handling the SMS by updating the UE context.

Operation 8. After a successful change of SMSF, the AMF transmits an SMS service deactivation message Nsmsf_Service_Deactivation to the old SMSF. The SMS service deactivation message Nsmsf_Service_Deactivation may include the UE ID, and a context ID or a binding ID to find a subscriber context. Furthermore, the AMF may put the relocation indication in the SMS service deactivation message Nsmsf_Service_Deactivation to notify the old SMSF that the reason for service deactivation is a change of SMSF.

Operation 9. On receiving the SMS service deactivation message Nsmsf_Service_Deactivation in Operation 8, the old SMSF transmits its de-registration Nudm_UECM_DeRegistration Request message for the UE to the UDM. The de-registration message Nudm_UECM_DeRegistration Request includes the UE ID, the SMSF ID (of the old SMSF), the SMSF address (of the old SMSF), and the relocation indication. The relocation indication may be included in the de-registration message Nudm_UECM_DeRegistration Request to notify the UDM that the reason for de-registration is the change of SMSF.

Operation 10. The UDM may delete old SMSF information at the request of the old SMSF, in which case the UDM may not delete registration information of the other SMSF (the new SMSF in the embodiment) when the registration indication is included. Subsequently, the UDM notifies that de-registration is completed by transmitting a message Nudm_UECM_DeRegistration Response to the old SMSF.

Operation 11. The old SMSF notifies that deactivation has been performed by transmitting Nsmsf_Service_Deactivation response to the AMF.

Figure 8:
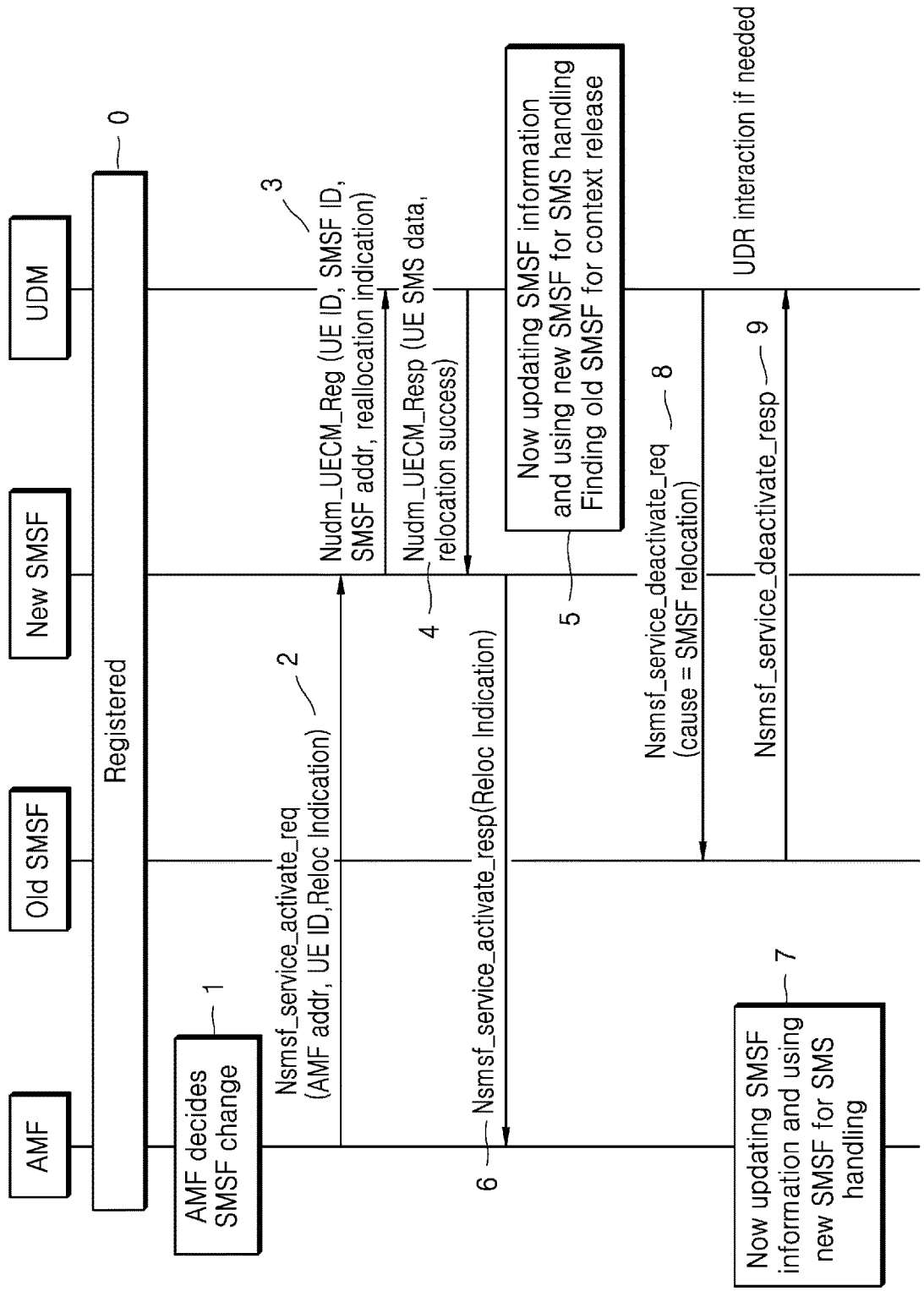
FIG. 8 is a sequence diagram illustrating an SMSF change procedure by an AMF and a procedure for deactivating an existing SMSF by a UDM without using context transfer, according to an embodiment of the disclosure.

FIG. 8 is a sequence diagram illustrating an SMSF change procedure by an AMF and a procedure for deactivating an existing SMSF by a UDM without using context transfer, according to an embodiment of the disclosure.

Operation 0. An SMSF may be registered so that an SMS service is provided for the UE (subscriber). During the registration procedure, the SMS service for the UE is configured to be supported by the old SMSF.

Operation 1. The AMF determines to change the SMSF. A change of SMSF may be made when the AMF is changed due to movement of the UE, when the existing SMSF has a fault, or for a load distribution purpose. When backup SMSF information is configured in a UE context, the AMF may determine a new SMSF using the backup SMSF information or select an SMSF in the existing SMSF set. When information for selecting an SMSF is required, the AMF may obtain an SMSF address through the NRF, and the AMF may transmit a request message including an SMSF set ID to the NRF. Furthermore, the AMF may put a backup SMSF request in the request message to obtain backup SMSF information for the existing SMSF.

Operation 2. The AMF transmits an SMS service activation message Nsmsf_SMService_Activate request to the selected new SMSF instance. The SMS service activation message Nsmsf_SMService_Activate request includes an AMF address and a UE ID. Furthermore, the SMS service activation message Nsmsf_SMService_Activate request may include old SMSF information and a binding or context ID for receiving the UE context created previously. The SMS service activation message Nsmsf_SMService_Activate request may additionally include a relocation indication to indicate that the SMSF has changed and that the change is in progress. The AMF may start a timer to transmit the message Nsmsf_SMService_Activate to the new SMSF, and when a response message Nsmsf_SMService_Activate response fails to arrive within a preset time T_Request, the AMF may reselect one of the SMSFs obtained in Operation 2 to transmit the message Nsmsf_SMService_Activate, or restart from selection of an SMSF of Operation 1.

Operation 3. The new SMSF may perform registration to the UDM through a request message (e.g., Nudm_UECM_Registration). The request message Nudm_UECM_Registration includes a UE ID, an SMSF ID (of the new SMSF), an SMS address (of the new SMSF), and a relocation indication. The relocation indication may be used to notify the new SMSF that the SMSF has changed and that the change is in progress. In a case that a value of the relocation indication is set, the UDM may only delete the relocation indication from information about the new SMSF when receiving a de-registration request having a reason for relocation from the other SMSF.

Operation 4. The UDM may transmit a response Nudm_UECM_Registration response that an SMSF for the UE is registered as a new SMSF to the new SMSF. The response message may include user subscription information relating to the SMS service (UE SMS subscription data) for the new SMSF to create a context for providing the SMS service.

Operation 5. Subsequently, the UDM may respond with an SMSF to deal with an occasion when an MT SMS occurs as the new SMSF.

Operation 6. The new SMSF may transmit a response message Nsmsf_SMService_Activate response to the AMF in response to the SMS service activation message received in Operation 2. The new SMSF may put relocation indication indicating that the SMSF has changed in the response message Nsmsf_SMService_Activate response.

Operation 7. Subsequently, the AMF changes the SMSF from the old SMSF to the new SMSF for handling the SMS by updating the UE context.

Operation 8. After the change of SMSF (Operation 5), the UDM requests SMS service deactivation by transmitting a message Nsmsf_Service_Deactivation request to the old SMSF. The SMS service deactivation request message Nsmsf_Service_Deactivation request may include the UE ID, and a context ID or a binding ID to quickly find a context. Furthermore, the UDM may put the relocation indication in the SMS service deactivation request message Nsmsf_Service_Deactivation request to notify the old SMSF that the reason for service deactivation is a change of SMSF.

Operation 9. The old SMSF deletes the UE context at the request of the UDM, and notifies the UDM that deactivation is completed through a message Nsmsf_Service_Deactivation response.

An embodiment of the disclosure proposes a method of discovering and selecting an optimal AMF that is able to provide a service for the UE in motion. Specifically, when an AMF supporting a multiple access (MA) PDU session (hereinafter, supporting access traffic steering, switching, splitting (ATSSS)) to process a session by using the common 3GPP and non-3GPP (N3GPP) radio network and a non-supporting AMF coexist, there is a need for a technology of selecting an AMF supporting the ATSSS based on UE capability (about whether to support the ATSSS) and a service type. Especially, when the UE are using the ATSSS service and AMF re-selection occurs due to movement of the UE, a procedure for selecting an AMF that supports the ATSSS is required.

Figure 9:
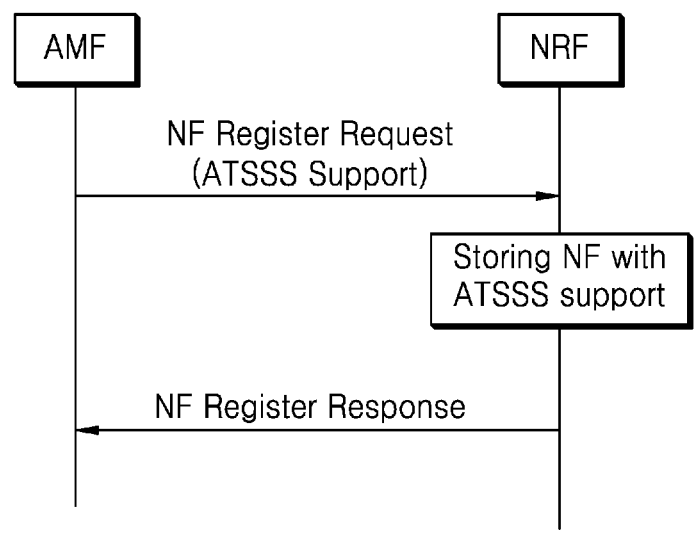
FIG. 9 is a sequence diagram illustrating a procedure in which a network function (NF) registers itself in a network repository function (NRF), according to an embodiment of the disclosure.

FIG. 9 is a sequence diagram illustrating a procedure in which a particular NF (e.g., an AMF) registers itself in an NRF, according to an embodiment of the disclosure.

Operation 1. An NF (e.g., an AMF or an SMF) notifies an NRF of whether it supports ATSSS (MA PDU session process) during an NF registration procedure performed with the NRF. Notifying of whether to support ATSSS may include putting information indicating ATSSS capability in a portion of an NF profile included in an NF register request message, or specifying whether a supported feature of the NF includes ATSSS.

Operation 2. The NRF stores information included in the registration request of the NF along with information about whether to support ATSSS.

Operation 3. The NRF transmits a response to the registration request of the NF to the NF.

Figure 10:
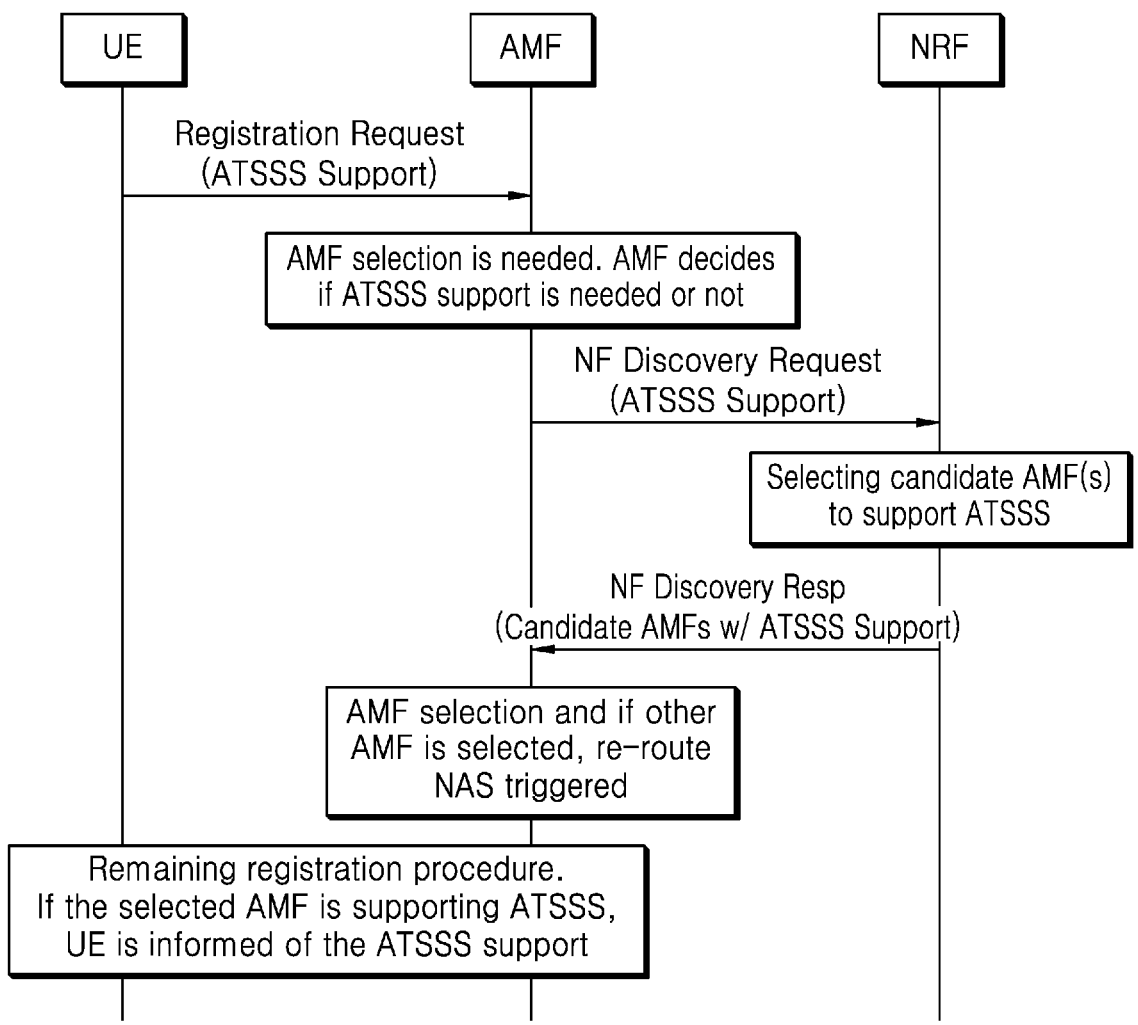
FIG. 10 is a sequence diagram illustrating an AMF selection procedure for a user equipment (UE), according to an embodiment of the disclosure.

FIG. 10 is a sequence diagram illustrating an AMF selection procedure for a UE, according to an embodiment of the disclosure.

Operation 1. The UE transmits a registration request message to an AMF over a 5G network. The registration request message may include information indicating whether to support ATSSS for the UE or information indicating a request to use ATSSS.

Operation 2. The AMF, upon reception of the registration request of the UE, determines whether the ATSSS support for the UE is required. Whether the ATSSS support is required may be determined by taking into account when the UE explicitly indicates whether to support ATSSS or request for use of ATSSS in the request message in Operation 1, or by using an occasion when subscription information received from a UDM includes information indicating that use of ATSSS is required or when policy information received by the AMF from a PCF includes information indicating that use of ATSSS is required. The AMF takes into account whether to support ATSSS during the AMF selection procedure. When ATSSS support is required for the UE, the AMF selects an AMF that supports ATSSS.

Operation 3. When the AMF needs to perform AMF selection through an NRF and ATSSS support for the UE is required, the AMF may request an AMF that supports ATSSS in an NF discovery request to be transmitted to the NRF. The NF discovery request may also include other information to be taken into account in AMF selection.

Operation 4. The NRF selects AMFs that satisfy an AMF selection condition including whether to support ATSSS from among AMFs.

Operation 5. The NRF sends information of the selected candidate AMFs to the AMF. In this case, information indicating whether ATSSS is supported for each candidate AMF may be included together in a response message.

Operation 6. When a new AMF is selected for the UE, the AMF transmits a NAS message received from the UE and a reroute NAS message including information of the selected AMF to a base station (BS).

Operation 7. The rest of the registration procedure is performed in the UE and the AMF. An AMF finally selected for the UE includes an indicator indicating whether to support ATSSS in a registration response message to be sent to the UE. The UE needs to not trigger a MA PDU session request when the registration response message received from the AMF does not include the indicator indicating support of the ATSSS.

In the meantime, the AMF needs to homogeneously support the ATSSS in a registration area to be applied for the UE when a response message in a registration response to be sent to the UE includes the indicator indicating that ATSSS is supported. This is to organize the MA PDU session, update whether to support ATSSS between the UE and the network, or synchronize a session context when the UE moves from an area where ATSSS is supported to an unsupported area or the UE is relocated from an AMF that supports ATSSS to a non-supporting AMF. For this, the AMF needs to not notify the UE that ATSSS is supported when a registration area is limited only to an area where ATSSS is supported altogether or when ATSSS is not homogeneously supported in the registration area for the UE. For this, the AMF needs to be able to create or manage a registration area to be applied to the UE by taking into account a service area of an SMF that supports the ATSSS. Furthermore, when AMFs are formed with AMF sets, AMFs included in the same AMF set need to be equally configured about whether to support the ATSSS for a given area (e.g., one TA or a set of two or more TAs).

In another embodiment of the disclosure, a method of exchanging whether to support ATSSS in network slice information between the UE and the network is proposed. Specifically, in the 5GS, a network slice in which ATSSS is supported is defined and NFs (AMF, SMF, UPF, etc.) that support the ATSSS may be selected by accessing the corresponding slice.

More specifically, a slice that supports the ATSSS may be classified by a separate slice identifier (S-NSSAI), which may be defined by a standardized slice identifier or may be determined by a policy (e.g., URSP) allocated by an operator and sent to the UE or by information configured for the UE. In the case of the standardized slice, a slice that supports the ATSSS is represented with an SST value as illustrated in the following Table 1 and needs to be interpreted to have the same meaning by any PLMN.

TABLE 1

| Slice/Service type | SST value | Characteristics |
| --- | --- | --- |
| eMBB | 1 | Slice suitable for the handling of 5G enhanced Mobile Broadband. |
| URLLC | 2 | Slice suitable for the handling of ultra-reliable low latency communications. |
| MioT | 3 | Slice suitable for the handling of massive IoT. |
| V2X | 4 | Slice suitable for the handling of V2X services. |
| ATSSS | X | Slice suitable for the handling of multiple PDU sessions |

When the UE supports the ATSSS and there is a need to use the ATSSS, the UE selects a slice that supports the ATSSS and performs a registration procedure and a session creation procedure with the corresponding slice identifier. Specifically, in a case that a requested NSSAI of the UE includes ATSSS, when there is a network slice that supports the ATSSS in the operator network and access to the slice is allowed for the subscriber, the slice that supports the ATSSS is selected. Through this procedure, NFs such as AMF, SMF, UPF, etc., are selected, and the UE is able to request a MA PDU session. For this, the AMF may explicitly put whether to support ATSSS in a discovery request when selecting a slice during a UE registration procedure or performing a procedure with an NSSF for selecting a candidate AMF that supports the slice. Specifically, before this procedure, the AMF in the network may indicate whether it supports ATSSS during an NSSAIAvailabilityUpdate procedure performed with the NSSF, and whether to support ATSSS may be identified and delivered as being valid for a particular area (TA) or a particular slice (S-NSSAI). Subsequently, the NSSF may receive a service request for slice selection from the AMF, and may select and respond to an AMF that supports ATSSS as a candidate AMF.

Figure 11:
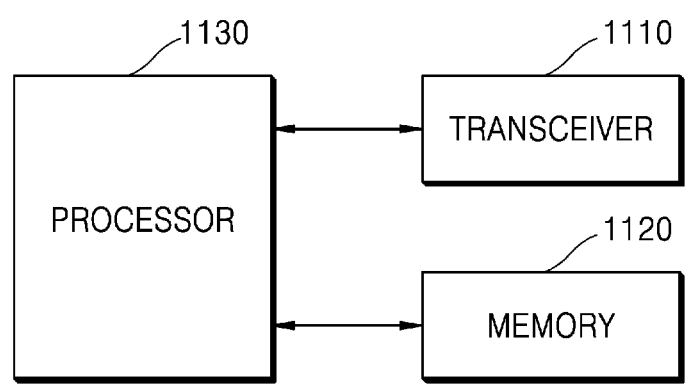
FIG. 11 is a block diagram illustrating a structure of a UE, according to an embodiment of the disclosure.

FIG. 11 is a block diagram illustrating a structure of a UE, according to an embodiment of the disclosure.

Referring to FIG. 11, the UE may include a processor 1130, a transceiver 1110, and a memory 1120. Components of the UE are not, however, limited thereto. For example, the UE may include more or fewer elements than described above. In addition, the processor 1130, the transceiver 1110, and the memory 1120 may be implemented in a single chip.

In an embodiment, the processor 1130 may control a series of processes for the UE to be operated according to the aforementioned embodiments of the disclosure. For example, it may control the components of the UE to perform the method of providing a short message service according to embodiments of the disclosure. The processor 1130 may be provided in the plural, which may perform the aforementioned operation for protecting information of the disclosure by carrying out a program stored in the memory 1120.

The transceiver 1110 may transmit or receive signals to or from a BS. The signals to be transmitted to or received from the BS may include control information and data. The transceiver 1110 may include an RF transmitter for up-converting the frequency of a signal to be transmitted and amplifying the signal and an RF receiver for low-noise amplifying a received signal and down-converting the frequency of the received signal. It is merely an example, and the components of the transceiver 1110 are not limited to the RF transmitter and RF receiver. In addition, the transceiver 1110 may receive a signal on a wireless channel and output the signal to the processor 1130, and transmit a signal output from the processor 1130 on a wireless channel.

In an embodiment, the memory 1120 may store a program and data required for operation of the UE. Furthermore, the memory 1120 may store control information or data included in a signal transmitted or received by the UE. The memory 1120 may include a storage medium such as a read only memory (ROM), a random access memory (RAM), a hard disk, a compact disc ROM (CD-ROM), and a digital versatile disk (DVD), or a combination of storage mediums. Moreover, the memory 1120 may be in the plural. According to an embodiment, the memory 1120 may store a program to establish group communication based on D2D communication as described above.

Figure 12:
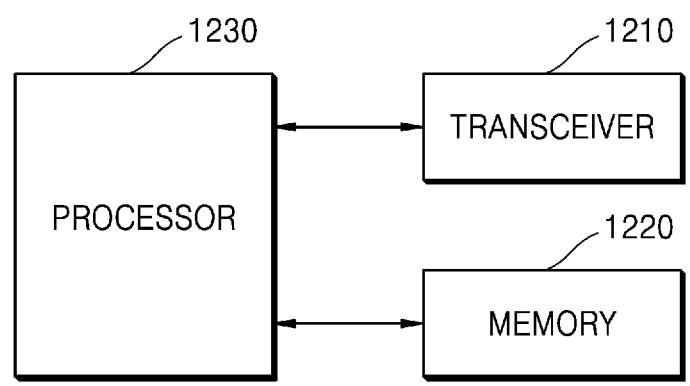
FIG. 12 is a block diagram illustrating a structure of a base station (BS), according to an embodiment of the disclosure.

FIG. 12 is a block diagram illustrating a structure of a BS, according to an embodiment of the disclosure.

Referring to FIG. 12, the BS may include a processor 1230, a transceiver 1210, and a memory 1220. Components of the BS are not, however, limited thereto. For example, the BS may include more or fewer elements than described above. In addition, the processor 1230, the transceiver 1210, and the memory 1220 may be implemented in a single chip.

The processor 1230 may control a series of processes for the BS to be operated according to the embodiments of the disclosure. For example, it may control the components of the BS to perform the method of providing a short message service according to embodiments of the disclosure.

The transceiver 1210 may transmit or receive signals to or from a UE. The signals to be transmitted to or received from the UE may include control information and data. The transceiver 1210 may include an RF transmitter for up-converting the frequency of a signal to be transmitted and amplifying the signal and an RF receiver for low-noise amplifying a received signal and down-converting the frequency of the received signal. It is merely an example, and the components of the transceiver 1210 are not limited to the RF transmitter and RF receiver. In addition, the transceiver 1210 may receive a signal on a wireless channel and output the signal to the processor 1230, and transmit a signal output from the processor 1230 on a wireless channel. The processor 1230 may be provided in the plural, which may perform the aforementioned method of protecting information in a wireless communication system of the disclosure by carrying out a program stored in the memory 1220.

In an embodiment, the memory 1220 may store a program and data required for operation of the BS. Furthermore, the memory 1220 may store control information or data included in a signal transmitted or received by the BS. The memory 1220 may include a storage medium such as a EEROM, a RAM, a hard disk, a CD-ROM, and a DVD, or a combination of storage mediums. Moreover, the memory 1220 may be in the plural. In some embodiments, the memory 1220 may store a program to perform the aforementioned method of providing a short message service of the disclosure.

Figure 13:
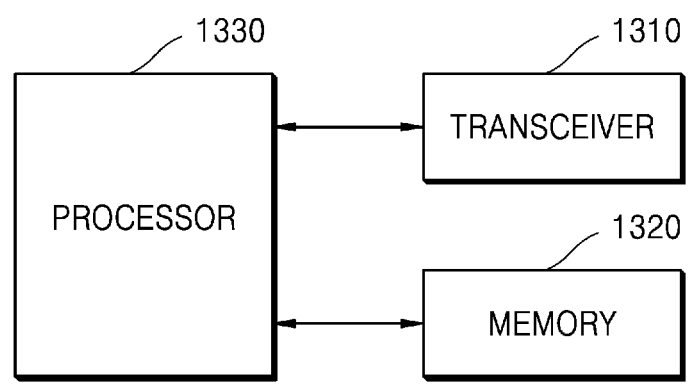
FIG. 13 is a block diagram illustrating a structure of a core network entity, according to an embodiment of the disclosure.

FIG. 13 is a block diagram illustrating a structure of a core network entity, according to an embodiment of the disclosure. "Unit", "module", "block", etc., as used herein each represent a unit for handling at least one function or operation, and may be implemented in hardware, software, or a combination thereof. For example, the core network entity or network function may include an AMF, an SMSF, a UDM, a UDR, etc.

Referring to FIG. 13, the core network entity may include a transceiver 1310, a memory 1320, and a processor 1330.

The transceiver 1310 may provide an interface for communicating with other devices in the network. Specifically, the transceiver 1310 may convert a bitstream to be transmitted to another device from the core network entity into a physical signal and convert a physical signal received from the other device into a bitstream. That is, the transceiver 1310 may transmit or receive a signal. Hence, the transceiver 1310 may also be referred to as a modem, a transmitter, a receiver, a communication unit, or a communication module. In this case, the transceiver 1310 may allow the core network entity to communicate with other devices or systems through backhaul connection (e.g., wired backhaul or wireless backhaul) or other connection methods, or over a network.

The memory 1320 may store a basic program for operation of the core network entity, an application program, and data such as settings information. The memory 1320 may include a volatile memory, a non-volatile memory, or a combination of the volatile memory and the non-volatile memory. The memory 1320 may also provide the stored data at the request of the processor 1330.

The processor 1330 may control general operation of the core network entity. For example, the processor 1330 may transmit or receive a signal through the transceiver 1310. The processor 1330 may record data to the memory 1320 or read out data from the memory 1020. For this, the processor 1330 may include at least one processor. The processor 1330 may control the core network entity to perform operations according to the aforementioned various embodiments of the disclosure. For example, it may control the components of the core network entity to perform the method of providing a short message service according to embodiments of the disclosure.

Methods according to the claims of the disclosure or the embodiments described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus for performing the embodiments of the disclosure through an external port. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have been described, but a person of ordinary skill in the art will understand and appreciate that various modifications can be made without departing the scope of the disclosure. Thus, it will be apparent to those ordinary skilled in the art that the disclosure is not limited to the embodiments of the disclosure described, which have been provided only for illustrative purposes. Furthermore, the embodiments may be operated by being combined with one another as needed. For example, an embodiment and some of another embodiment of the disclosure may be combined together. Although the embodiments are proposed based on an LTE system, a 5G or NR system, etc., modifications to the embodiments may be made within the scope of the disclosure.

The invention claimed is:

1. A method performed by an access and mobility management function (AMF) device in a wireless communication system, the method comprising:
   receiving a network registration request message from a terminal;
   determining whether the terminal requires support for access traffic steering, switching, splitting (ATSSS);
   in case that the terminal requires support for the ATSSS, requesting information about an AMF device supporting the ATSSS from a network repository function (NRF) device;
   receiving, from the NRF device, information about at least one candidate AMF device supporting the ATSSS;
   selecting an AMF device to perform a network registration procedure for the terminal, based on the information about the at least one candidate AMF device; and
   transmitting a re-route request message including information about the selected AMF device to a base station.

2. The method of claim 1,
   wherein the network registration request message comprises information about whether the terminal is allowed for the ATSSS, and
   wherein the determining of whether the terminal requires support for the ATSSS comprises determining that the terminal requires support for the ATSSS in case that the terminal is allowed for the ATSSS.

3. The method of claim 1, wherein the determining of whether the terminal requires the support for the ATSSS comprises determining whether the terminal requires support for the ATSSS based on subscription information of the terminal received from a user data management (UDM) device.

4. The method of claim 1, wherein the determining of whether the terminal requires support for the ATSSS comprises determining whether the terminal requires support for the ATSSS based on policy information related to the terminal received from a policy control function (PCF) device.

5. The method of claim 1,
   wherein the requesting of the information about an AMF device supporting the ATSSS from the NRF device comprises requesting the information about an AMF device supporting the ATSSS from the NRF device through a network function (NF) discovery request, and
   wherein the receiving, from the NRF device, of the information about the at least one candidate AMF device supporting the ATSSS comprises receiving, from the NRF device, a response to the NF discovery request including the information about the at least one candidate AMF device supporting the ATSSS.

6. The method of claim 1,
   wherein the network registration request message is a non-access stratum (NAS) message received from the terminal.

7. The method of claim 1, wherein support for the ATSSS comprises support for a multiple-access (MA) protocol data unit (PDU) session using a 3GPP network and a non-3GPP network.

8. An access and mobility management function (AMF) device in a wireless communication system, the AMF device comprising:
   a transceiver; and
   at least one processor, wherein the at least one processor is configured to:
      receive a network registration request message from a terminal,
      determine whether the terminal requires support for access traffic steering, switching, splitting (ATSSS),
      in case that the terminal requires support for the ATSSS, request information about an AMF device supporting the ATSSS from a network repository function (NRF) device,
      receive, from the NRF device, information about at least one candidate AMF device supporting the ATSSS,
      select an AMF device to perform a network registration procedure for the terminal, based on the information about the at least one candidate AMF device, and
      transmit a re-route request message including information about the selected AMF device to a base station.

9. The AMF device of claim 8,
   wherein the network registration request message comprises information about whether the terminal is allowed for the ATSSS, and
   wherein the at least one processor is configured to determine that the terminal requires support for the ATSSS in case that the terminal is allowed for the ATSSS.

10. The AMF device of claim 8, wherein the at least one processor is configured to determine whether the terminal requires support for the ATSSS based on subscription information of the terminal received from a user data management (UDM) device.

11. The AMF device of claim 8, wherein the at least one processor is configured to determine whether the terminal requires support for the ATSSS based on policy information related to the terminal received from a policy control function (PCF) device.

12. The AMF device of claim 8, wherein the at least one processor is configured to:
   request information about an AMF device supporting the ATSSS from the NRF device through a network function (NF) discovery request; and
   receive, from the NRF device, a response to the NF discovery request including the information about the at least one candidate AMF device supporting the ATSSS.

13. The AMF device of claim 8, wherein the network registration request message is a non-access stratum (NAS) message received from the terminal.

14. The AMF device of claim 8, wherein support for the ATSSS comprises support for a multiple-access (MA) protocol data unit (PDU) session using a 3GPP network and a non-3GPP network.

\* \* \* \* \*